(12) United States Patent
Murad

(10) Patent No.: US 8,066,089 B2
(45) Date of Patent: Nov. 29, 2011

(54) DUAL POWERED FULL SUSPENSION TRICYCLE

(76) Inventor: Deema Murad, Amman (JO)

( * ) Notice: Subject to any disclaimer, the term of this patent is extended or adjusted under 35 U.S.C. 154(b) by 113 days.

(21) Appl. No.: 12/555,265

(22) Filed: Sep. 8, 2009

(65) Prior Publication Data

US 2011/0056756 A1    Mar. 10, 2011

(51) Int. Cl.
     *B60K 1/00*      (2006.01)
     *B60K 17/02*      (2006.01)
(52) U.S. Cl. ......... 180/205; 180/210; 180/215; 280/282
(58) Field of Classification Search ............... 180/205, 180/210, 215; 280/282
See application file for complete search history.

(56) References Cited

U.S. PATENT DOCUMENTS

| | | | |
|---|---|---|---|
| 3,598,195 A | | 8/1971 | Steller |
| 3,713,502 A | * | 1/1973 | Delaney et al. ............... 180/205 |
| 3,759,339 A | * | 9/1973 | Farrow ............................. 180/216 |
| 4,183,418 A | * | 1/1980 | Dudas ............................. 180/216 |
| 6,158,542 A | * | 12/2000 | Nolet ............................. 180/206 |
| 6,361,059 B1 | | 3/2002 | Ellsworth |
| 7,350,797 B2 | | 4/2008 | Carroll |
| 2010/0065360 A1 | * | 3/2010 | Gulas ............................. 180/205 |

OTHER PUBLICATIONS

See Belize Bicycle E-RIDER-MTB-ELECTRIC, www.belizebike. com/english/eridermtb.html, Jun. 5, 2009.
See Belize Bicycle TRI-RIDER ELEK-TRIKE, www.belizebike. com/english/elektrike.html, Jun. 5, 2009.

* cited by examiner

*Primary Examiner* — Kevin Hurley
(74) *Attorney, Agent, or Firm* — Clark G. Sullivan; Arnall Golden Gregory LLP

(57) ABSTRACT

A cycling vehicle is provided in which a first rear wheel is powered exclusively by a bicycle pedal, and a second rear wheel is powered exclusively by an electric motor. The cycling vehicle includes bicycle suspension comprising a seat tube, a paired rear triangle with a connecting member that connects the chain stay and the seat stay, a shock absorber in connection with the seat tube and the connecting member, and a pivot arm in connection with the seat tube and the connecting member.

5 Claims, 3 Drawing Sheets

DUAL POWERED FULL SUSPENSION TRICYCLE

FIELD OF THE INVENTION

The present invention relates to power systems and suspension systems for tricycles.

BACKGROUND OF THE INVENTION

Electric Cycling Vehicles

Cycling vehicles that are equipped with electric motors can travel farther than cycling vehicles powered by pedaling alone. In bicycles, the electric motor can be used to rotate the rear wheel on its axis. See Belize Bicycle E-RIDER MTB ELECTRIC, www.belizebike.com/english/eridermtb.html. In tricycles, the electric motor can be used to rotate the axle of the rear wheels. See Belize Bicycle TRI-RIDER ELEKTRIKE, www.belizebike.com/english/elektrike.html.

Powering tricycles is more difficult than powering bicycles because the rear wheels must rotate at different speeds when the tricycle is being turned. One solution to this problem is to install a differential to drive the pair of wheels with equal force while allowing them to rotate at different speeds. See U.S. Pat. No. 3,598,195 from Stelber Industries, Inc. Unfortunately, differential systems employ multiple shafts and gears, and these moving parts increase the cost and complexity of the tricycle.

Cycling Suspension Systems

Cycling vehicles that are equipped with suspension systems can create a more comfortable ride when traveling off-road or over rough terrain.

One simple type of suspension system is the "single pivot" type of rear suspension, which allows the paired rear triangle of the bicycle frame to rotate around a single pivot point. See U.S. Pat. No. 6,361,059 from Anthony Ellsworth. This "three bar" suspension design relies on a single pivot connecting the paired rear triangle of the bicycle frame to the main triangle, and a shock absorber placed in line with the seat stay. Unfortunately, the single pivot design suffers from a number of serious shortcomings. First, the design only allows room for a small shock absorber, which results in limited amount of travel and poor performance over large bumps. Second, pedaling and braking forces can compress the shock, which results in bobbing while pedaling and jerking while braking. Third, the suspension travel creates "chain growth," an increase in the distance between the pedals and the rear wheel, which can stiffen the pedal stroke and decrease efficiency.

Another type of suspension system is the more advanced "four bar" suspension system. See FIG. 3 of U.S. Pat. No. 7,350,797 from Ryan Carroll. This system uses a four bar linkage that consists of four rigid link members connected at pivot points to connect the main triangle to the rear wheel. The movement of the linkage is controlled by a separate shock absorber mounted between the linkage and the main frame. Four bar suspension systems are an improvement over single pivot designs because they allow the wheel to more back and forth as well as up and down, which helps the wheel roll smoothly over bumps. However, four bar suspension systems complicate bike design due to requirement of additional link members.

SUMMARY OF THE INVENTION

The present invention is premised on the finding that powering a first rear wheel of a tricycle with an electric motor and a second rear wheel of a tricycle with a bicycle pedal allows the tricycle to easily turn without the need for a complex differential system. The present invention also is premised on the finding that a shock absorber can be used as a link member to create a new type of "four bar" suspension system with a high degree of travel and a lower number of rigid link members. Based on these findings, a dual powered full suspension tricycle has been developed that is eco-friendly and capable of traveling long distances over a variety of terrains with a relatively large amount of cargo. Due to the unique design of the power and suspension system and the fact that all parts of the tricycle have been selected to allow for easy maintenance, the tricycle is both economic to buy and easy to maintain.

The tricycle has a long range and a high load capacity because of the unique design of the power system. The long range and high load capacity is achieved by a dual power system that allows one rear wheel to be powered by an electric motor, and the other rear wheel to be powered by a bicycle pedal. Because each wheel is powered independently, the wheels can turn at different speeds so as to allow for easy turning. Furthermore, the battery used to power the electric motor can be recharged using a generator that is linked to the bicycle pedal, so that the rider can store extra power generated while traveling on light or down hill terrain. Because the battery can be charged using the pedals alone, the operation of the bicycle can be completely eco-friendly.

The tricycle is versatile because of it's unique suspension system. Because the suspension is based on a "four-bar" type linkage between the main frame and rear wheels, the rear wheels can move both up and down and back and forth to create a smooth ride. Furthermore, by utilizing the seat post of the main frame as one of the linkages, and the shock absorber as another of the linkages, the suspension system requires less additional link members, and allows for a high degree of travel. As a result, the suspension is more economic and easy to maintain than current four bar suspension systems, and can maintain stability even on large pumps. A further advantage of utilizing the shock absorber as one of the linkages is that, unlike previous four-bar type linkages, the suspension can operate with only three pivots, since the shock absorber can change in length to allow movement of the linkage.

Thus, in one embodiment the invention provides a dual powered cycling vehicle comprising (a) a first wheel, a second wheel, and a third wheel, wherein the first wheel is positioned parallel to the second wheel, and wherein the third wheel is positioned in tandem with the first wheel and the second wheel; (b) a bicycle pedal connected to the first wheel so that power generated with the pedal is applied to the first wheel and is not applied to the second wheel; and (c) an electric motor connected to the second wheel so that power generated with the motor is applied to the second wheel and is not applied to the first wheel.

In another embodiment the invention provides a method of providing two sources of power to a cycling vehicle comprising generating a first amount of mechanical power with a bicycle pedal; (b) applying the first amount of mechanical power to the first wheel without applying the first amount of mechanical power to the second wheel; (c) generating a second amount of mechanical power with an electric motor; and (d) applying the second amount of mechanical power to the second wheel without applying the second amount of mechanical power to the first wheel.

In still other embodiments the invention provides a bicycle suspension comprising (a) a main frame comprising a seat tube, (b) a paired rear triangle comprising a chain stay, a seat stay, and a connecting member, wherein a first end of the chain stay connects with a first end of the seat stay at a dropout, and wherein the connecting member connects a second end of the chain stay with a second end of the seat stay; (c) a shock absorber in connection with the seat tube at a first connection point and the connecting member at a second connection point; and (d) a pivot arm in connection with the seat tube at a third connection point and the connecting member at a fourth connection point, wherein the first connection point is positioned on the seat tube above the third connection point, wherein the second connection point is positioned on the connecting member above the fourth connection point, and wherein at least three of the four connection points are pivotal.

Additional embodiments and advantages of the invention will be set forth in part in the description which follows, and in part will be obvious from the description, or may be learned by practice of the invention. The embodiments and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
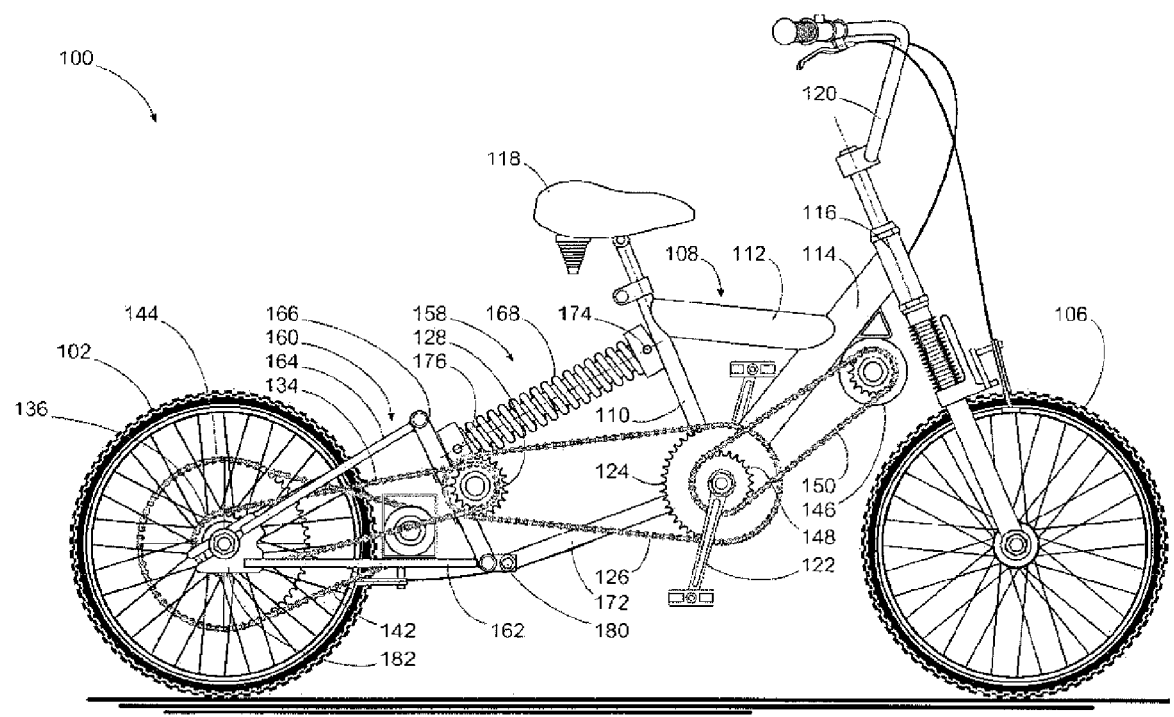
FIG. 1 is an illustration depicting a right side view of a tricycle with dual power and full suspension, in which the right rear wheel is powered with a bicycle pedal.

The present invention may be understood more readily by reference to the following definitions and detailed description of preferred embodiments of the invention.

DEFINITIONS AND USE OF TERMS

As used in this specification and in the claims which follow, the singular forms "a," "an" and "the" include plural referents unless the context clearly dictates otherwise. Thus, for example, reference to "a paired rear triangle" includes more than one paired rear triangle, and the like.

Throughout the description and claims of this specification, the word "comprise" and variations of the word, such as "comprising" and "comprises," means "including but not limited to," and is not intended to exclude, for example, other parts, components, or steps.

Dual Powered Cycling Vehicle

As discussed above, the invention provides a dual powered cycling vehicle with at least three wheels in which a first wheel is powered exclusively with a bicycle pedal, and a second parallel wheel is powered exclusively with a motor, so that the first and second wheels can rotate at different speeds when the tricycle is being turned without the need for a complex differential system.

In a preferred embodiment, the cycling vehicle comprises a tricycle. However, the cycling vehicle can include any number of wheels, so long as at least two powered wheels are parallel, and at least one other wheel is positioned in tandem with the two powered wheels. The wheel positioned in tandem with the first wheel is preferably positioned as in a traditional tricycle i.e. directly in front of the location that is in the middle of the two parallel wheels. However, the wheel positioned in tandem can alternatively be positioned as in a motorcycle with a sidecar i.e. directly in front of one of the two parallel wheels. To allow the tricycle to travel in a variety of terrains, each of the tricycle wheels is preferably an off-road tire with deep grooves to allow for better traction on loose ground.

The bicycle pedal that powers the first wheel can connect to the first wheel as in a traditional bicycle pedal i.e. with a pedal sprocket connected to the pedal, a pedal chain connected to the pedal sprocket, a first wheel sprocket connected to the pedal chain, wherein the first wheel sprocket is connected to the first wheel. This type of connection can be particularly suitable to embodiments wherein the wheel positioned in tandem is positioned directly in front of one of the two parallel wheels. Furthermore, this type of connection can be used in embodiments wherein the wheel positioned in tandem is positioned as in traditional tricycles. For example, the first wheel sprocket can be located in the middle of the two parallel wheels, and connected to the first wheel using a shaft or other suitable means.

In a preferred embodiment, the bicycle pedal that powers the first wheel is connected to the first wheel by means of a shaft that moves the power generated with the pedal to a position that is directly in front of the first wheel. Specifically, a first pedal sprocket connected to the pedal can rotate a pedal chain that is connected to the shaft by means of a first shaft sprocket. The first shaft sprocket can rotate the shaft, and the shaft can rotate a first wheel chain by means of a second shaft sprocket. Finally, the first wheel chain can rotate the first wheel by means of the first wheel sprocket. The shaft can be mounted on any portion of the cycling vehicle, but is preferably mounted between the pedal and the first wheel. In a particular embodiment, the shaft is mounted using two bearings on a connecting member that connects the chain stay and the seat stay.

The electric motor that powers the second wheel can connect to the second wheel using a chain and sprockets. Specifically, a motor sprocket connected to the electric motor can move a second wheel chain that is connected to the second wheel by means of a second wheel sprocket. In a preferred embodiment, the second wheel sprocket is exceptionally large so that the motor can provide a large amount of torque to the second wheel. The motor can be mounted on any portion of the cycling vehicle, but is preferably mounted between the rider and the second wheel. In a particular embodiment, the motor is mounted between the paired rear triangles. Non-limiting examples electric motors suitable for use in the cycling vehicle include 150 W motors and 200 W motors.

The cycling vehicle is preferably equipped with an electric generator that can generate electricity for powering the motor. The generator can be mounted on any portion of the cycling vehicle, but is preferably mounted in a location between the pedals and the front of the vehicle such on the down tube of the main frame. In a particular embodiment, the generator is connected to the pedal so that power generated with the pedal is applied to the generator. Specifically, a second pedal sprocket connected to the pedal can rotate a generator chain that is connected to the generator by a generator sprocket connected to the generator chain. The generator can be connected to the motor by a wire.

The cycling vehicle also is preferably equipped with a battery that can store the electricity used to power the motor. A non-limiting example of a battery suitable for use in the cycling vehicle is a 12 V solid battery. The battery can be mounted on any portion of the cycling vehicle, but is preferably mounted in a location between the rider and the second wheel. In a particular embodiment, the battery is mounted between the paired rear triangles. The battery can be connected to the generator so that electricity generated with the generator is stored in the battery. The battery can be connected to the motor and generator by a wire. In a particular embodiment, the tricycle has two 12 V solid batteries arranged so that the tricycle can be provided with power if one of the batteries is empty.

The cycling vehicle also can be equipped with an electrical outlet that can charge the battery when the vehicle is not in use. The outlet can be mounted on any portion of the cycling vehicle, but is preferably mounted in a location between the rider and the second wheel. In a particular embodiment, the outlet is mounted between the paired rear triangles. The outlet can be connected to the battery so that electricity received by the outlet is stored in the battery.

In a particular embodiment, the battery and/or the motor are mounted in a box that extends between the chain stays of the paired rear triangles.

Figure 2:
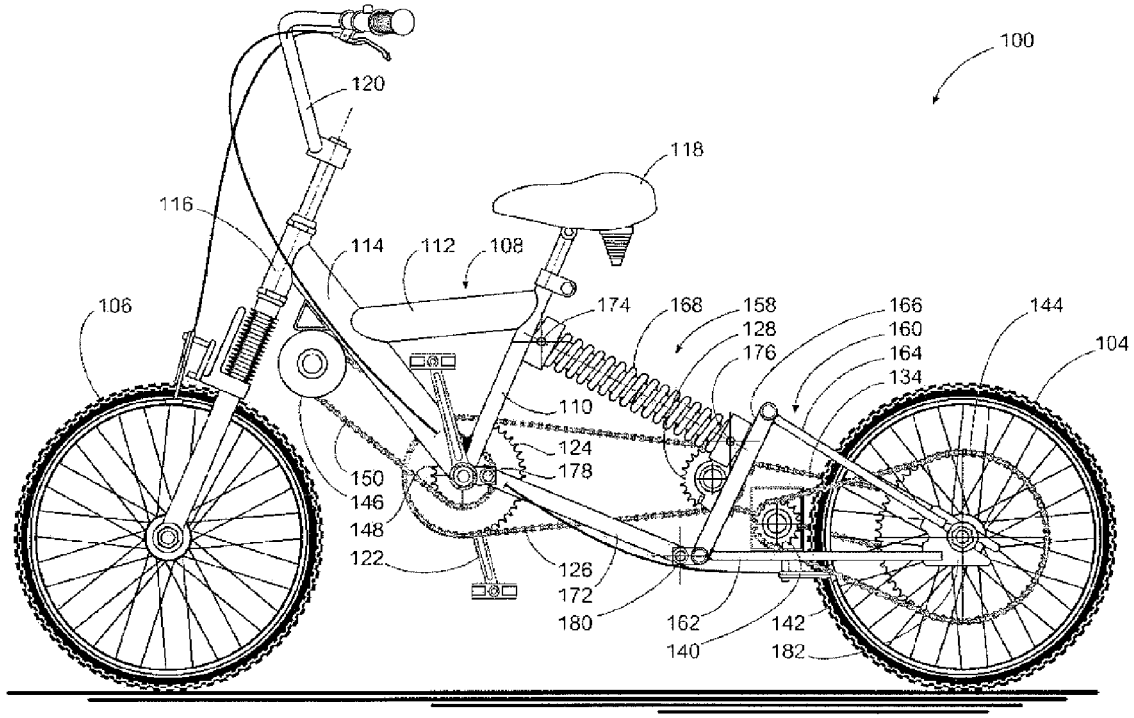
FIG. 2 is an illustration depicting a left side view of a tricycle with dual power and full suspension, in which the left rear wheel is powered with a motor.
Figure 3:
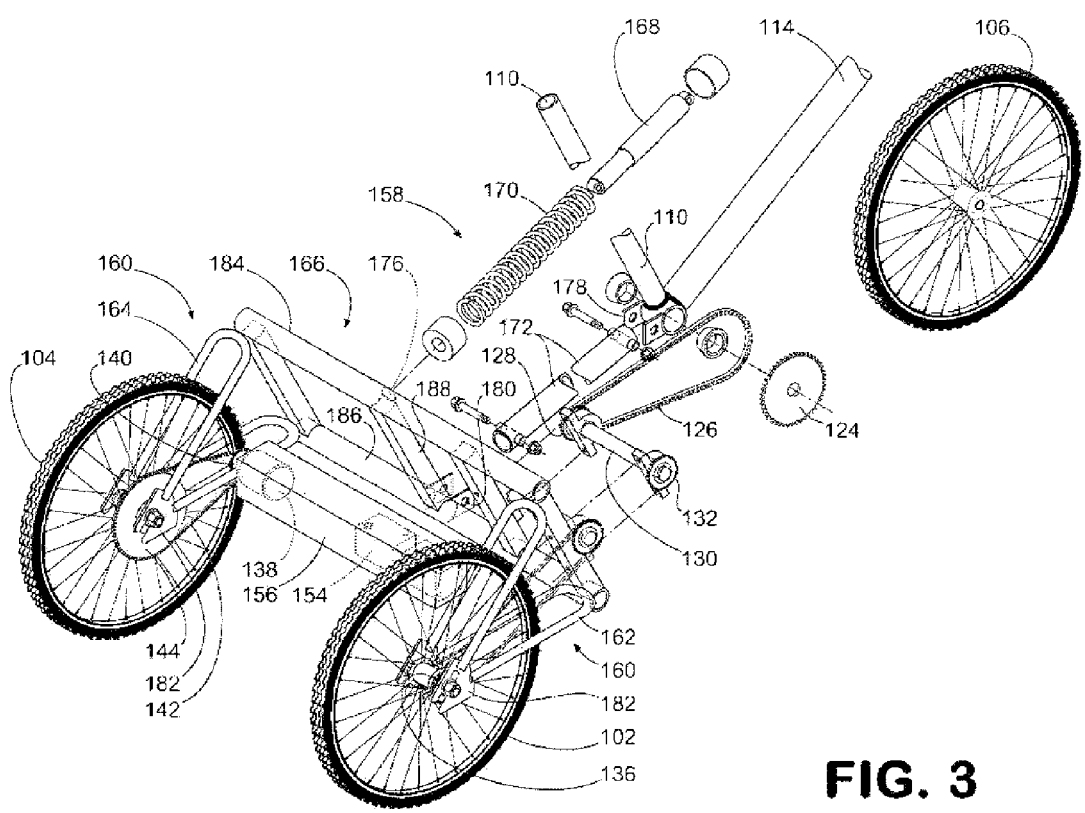
FIG. 3 is an illustration depicting a rear perspective partial view of a tricycle with dual power and full suspension, in which the suspension system is partially exploded.

The dual powered cycling vehicles can be further understood with reference to the non-limiting embodiments illustrated in FIGS. 1 through 3, which illustrate an exemplary embodiment of a dual powered cycling vehicle 100.

The dual powered cycling vehicle 100 includes a first wheel 102, a second wheel 104, and a third wheel 106. The vehicle 100 also includes a main frame 108 comprising a seat tube 110, a top tube 112, a down tube 114, and a head tube 116. The vehicle 100 further includes a seat 118, and a handlebar 120.

The first wheel 102 is powered by a bicycle pedal 122. The bicycle pedal 122 is connected to the first wheel 102 by a first pedal sprocket 124, a pedal chain 126, a first shaft sprocket 128, a shaft 130, a second shaft sprocket 132, a first wheel chain 134, and a first wheel sprocket 136.

The second wheel 104 is powered by an electric motor 138. The electric motor 138 is connected to the second wheel 104 by a motor sprocket 140, a second wheel chain 142, and a second wheel sprocket 144. The electric motor 138 is powered by an electric generator 146. The bicycle pedal 122 is connected to the electric generator 146 by a second pedal sprocket 148, a generator chain 150, and a generator sprocket 152. The cycling vehicle also includes a battery 154. The electric motor 138 and the battery 154 are mounted in a box 156.

Methods of Providing Two Sources of Power to a Cycling Vehicle

As discussed above, the invention also provides a method of providing two sources of power to a cycling vehicle. In a particular embodiment, the method includes (a) generating a first amount of mechanical power with a bicycle pedal; (b) applying the first amount of mechanical power to the first wheel without applying the first amount of mechanical power to the second wheel; (c) generating a second amount of mechanical power with an electric motor; and (d) applying the second amount of mechanical power to the second wheel without applying the second amount of mechanical power to the first wheel.

The step of applying the first amount of power generated by the bicycle pedal to the first wheel can be carried out as in a traditional bicycle i.e. by transferring the mechanical power from the pedal to a first pedal sprocket, from the first pedal sprocket to a pedal chain, from the pedal chain to a first wheel sprocket, and from the first wheel sprocket to the first wheel. This type of transfer can be particularly suitable to cycling vehicles in which the wheel positioned in tandem is positioned directly in front of one of the two parallel wheels. Furthermore, this type of transfer can be used in cycling vehicles wherein the wheel positioned in tandem is positioned as in traditional tricycles. For example, the first wheel sprocket can transfer the mechanical power to the first wheel using a shaft or other suitable means.

In a preferred embodiment, the step of applying the first amount of power generated by the bicycle pedal to the first wheel can be carried out by transferring the power to a shaft that then transfers the power to chain located directly in front of the first wheel. Specifically, the step can be carried out by transferring the mechanical power from the pedal to a first pedal sprocket, from the first pedal sprocket to a pedal chain, from the pedal chain to a first shaft sprocket, from the first shaft sprocket to a shaft, from the shaft to a second shaft sprocket, from the second shaft sprocket to a first wheel chain, from the first wheel chain to a first wheel sprocket, and from the first wheel sprocket to the first wheel.

The step of transferring the second amount of mechanical power from the electric motor to the second wheel can be carried out using a chain and sprockets. Specifically, the step can be carried out by transferring the mechanical power from the motor to a motor sprocket, from the motor sprocket to a second wheel chain, from the second wheel chain to a second wheel sprocket, and from the second wheel sprocket to a second wheel. In a preferred embodiment, the step includes creating a large amount of torque by transferring the mechanical power from the motor to an exceptionally large second wheel sprocket.

The method of power to the cycling vehicle can further comprise (e) applying the first amount of mechanical power to an electric generator; (f) generating electricity with the generator; and (g) applying the electricity to the motor. The step of applying the first amount of mechanical power to the generator can be carried out by transferring the mechanical power from the pedal to a second pedal sprocket, from the second pedal sprocket to a generator chain, from the generator chain to a generator sprocket, and from the generator sprocket to the generator. The step of applying the electricity to the motor can be carried out by storing the electricity in a battery, releasing the electricity from the battery, and applying the electricity to the motor.

Suspension for Cycling Vehicles

As discussed above, the invention also provides a bicycle suspension for cycling vehicles. The suspension comprises (a) a main frame including a seat tube, (b) a paired rear triangle including a chain stay, a seat stay, and a connecting member, wherein a first end of the chain stay connects with a first end of the seat stay at a dropout, and the connecting member connects a second end of the chain stay with a second end of the seat stay, (c) a shock absorber, wherein the shock absorber is in connection with the seat tube at a first connection point and the connecting member at a second connection point, and (d) a pivot arm, wherein the pivot arm is in connection with the seat tube at a third connection point and the connecting member at a fourth connection point, and wherein the first connection point is positioned on the seat tube above the third connection point, the second connection point is positioned on the connecting member above the fourth connection point, and at least three of the four connection points are pivotal.

The suspension can have any type of main frame, so long as it includes a seat tube. However, in a preferred embodiment, the main frame also includes a top tube, a down tube, and a head tube.

The suspension is preferably on a cycling vehicle that comprises two parallel powered rear wheels. However, the cycling vehicle can include only one rear wheel. Furthermore, the suspension is preferably on a cycling vehicle that includes two paired rear triangles. However, when the cycling vehicle includes only one rear wheel, the cycling vehicle can include only one paired rear triangle. In this particular embodiment, the connecting member is preferably contained in the same vertical plane as the seat tube.

As discussed above, the suspension includes a connecting member that connects a second end of the chain stays to a second end of the seat stays. The connecting member can comprise any rigid member such a tube or rod, and can be in any suitable shape such as a straight shape, a curved shape, or a planar shape. In those embodiments wherein the cycling vehicle comprises one powered rear wheel, the cycling vehicle can include one paired rear triangle, and the connecting member can be a tube or rod that connects the second end of the chain stays to the second end of the seat stays. In one embodiment wherein the cycling vehicle comprises two parallel powered rear wheels, the cycling vehicle can include two paired rear triangles, and the connecting member can comprise a planar connecting surface connected to each of the two paired rear triangles at the second ends of the seat stays and the second ends of the chain stays. In another embodiment wherein the cycling vehicle comprises two parallel powered rear wheels, the cycling vehicle can include two paired rear triangles, and the connecting member can comprise (1) an upper arm connected to each of the two paired rear triangles at the second ends of the seat stays, (2) a lower arm connected to each of the two paired rear triangles at the second ends of the chain stays, and (3) a connecting arm connecting the upper arm and the lower arm. The upper, lower, and connecting arm can comprise any rigid member such a tube or rod, and can be in any suitable shape such as a straight shape, a curved shape, or a planar shape.

The second connection point and the fourth connection point can be positioned on any part of the connecting member, so long as the second connection point is above the fourth connection point. Suitable locations for the second connection point include both the upper arm and the connection arm, and suitable locations for the fourth connection point include both the lower arm and the connection arm.

In a particular embodiment, the shock absorber is surrounded by a spring. The shock absorber and the pivot arm can be located in the same vertical plane. Alternatively, the shock absorber and the pivot arm can be located in different vertical planes. For example, in a particular embodiment, the suspension can include one shock absorber and two pivot arms, wherein each pivot arm is connected to the seat tube at the same connection point, and each pivot arm is connected to the connecting member at different points.

The pivot arm can comprise any rigid member such a tube or rod, and can be in any suitable shape such as a straight shape, a curved shape, or a planar shape. In a preferred embodiment, the pivot arm is a straight tube.

Because the suspension system uses the shock absorber as one of the linkages, the suspension can function with only three of the four connection points being pivotal. However, in a particular embodiment, all four of the connection points are pivotal.

The bicycle suspension can be further understood with reference to the non-limiting embodiments illustrated in FIGS. 1 through 3, which illustrate an exemplary embodiment of a bicycle suspension 158.

The bicycle suspension 158 includes a main frame 108 comprising a seat tube 110, a top tube 112, a down tube 114, and a head tube 116. The bicycle suspension 158 also includes two paired rear triangles 160 comprising a chain stay 162, a seat stay 164, and a connecting member 166. The bicycle suspension 158 further includes a shock absorber 168 surrounded by a spring 170, and a pivot arm 172.

The shock absorber 168 connects to the seat tube 110 and the connection member 166 at a first connection point 174 and a second connection point 176, respectively. Likewise, the pivot arm 172 connects to the seat tube 110 and the connection member 166 at a third connection point 178 and a fourth connection point 180, respectively.

The first end of the chain stay 162 and the first end of the chain stay 164 connect at a dropout 182. Furthermore, the second end of the chain stay 162 and the second end of the chain stay 164 are connected with the connection member 166. The connection member 166 comprises an upper arm 184, a lower arm 186, and a connecting arm 188.

Throughout this application, various publications are referenced. The disclosures of these publications in their entireties are hereby incorporated by reference into this application in order to more fully describe the state of the art to which this invention pertains. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A dual powered cycling vehicle, comprising:
   a) a first wheel, a second wheel, and a third wheel,
      wherein said first wheel is positioned parallel to said second wheel, and
      wherein said third wheel is positioned in tandem with said first wheel and said second wheel;
   b) a bicycle pedal,
      wherein said pedal is connected to said first wheel so that power generated with said pedal is applied to said first wheel and is not applied to said second wheel; and
      wherein said pedal is connected to said generator by: (i) a second pedal sprocket connected to said pedal; (ii) a generator chain connected to said second pedal sprocket; and (iii) a generator sprocket connected to said generator chain, wherein said generator sprocket is further connected to said generator;
   c) an electric motor,
      wherein said motor is connected to said second wheel so that power generated with said motor is applied to said second wheel and is not applied to said first wheel; and
   d) an electric generator,
      wherein said pedal is connected to said generator so that power generated with said pedal is applied to said generator, and
      wherein said generator is connected to said motor so that electricity generated with said generator is applied to said motor.

2. The vehicle of claim 1, wherein said pedal is connected to said first wheel by:
   i) a first pedal sprocket connected to said pedal;
   ii) a pedal chain connected to said first pedal sprocket; and iii) a first wheel sprocket connected said pedal chain, wherein said first wheel sprocket is further connected to said first wheel.

3. The vehicle of claim 1, wherein said pedal is connected to said first wheel by:
  i) a first pedal sprocket connected to said pedal;
  ii) a pedal chain connected to said first pedal sprocket;
  iii) a first shaft sprocket connected to said pedal chain;
  iv) a shaft connected to said first shaft sprocket;
  v) a second shaft sprocket connected to said shaft;
  vi) a first wheel chain connected to said second shaft sprocket; and
  vii) a first wheel sprocket connected to said first wheel chain, wherein said first wheel sprocket is further connected to said first wheel.

4. The vehicle of claim 1, wherein said motor is connected to said second wheel by:
  i) a motor sprocket connected to said motor;
  ii) a second wheel chain connected to said motor sprocket; and
  iii) a second wheel sprocket connected to said second wheel chain, wherein said second wheel chain is further connected to said second wheel.

5. The vehicle of claim 1, further comprising:
  e) a battery,
    wherein said generator is connected to said battery so that electricity generated with said generator is applied to said battery, and
    wherein said battery is connected to said motor so that electricity generated with said battery is applied to said motor.

* * * * *